Jan. 6, 1942. F. R. MORIN 2,268,841
SAW
Filed Sept. 19, 1939
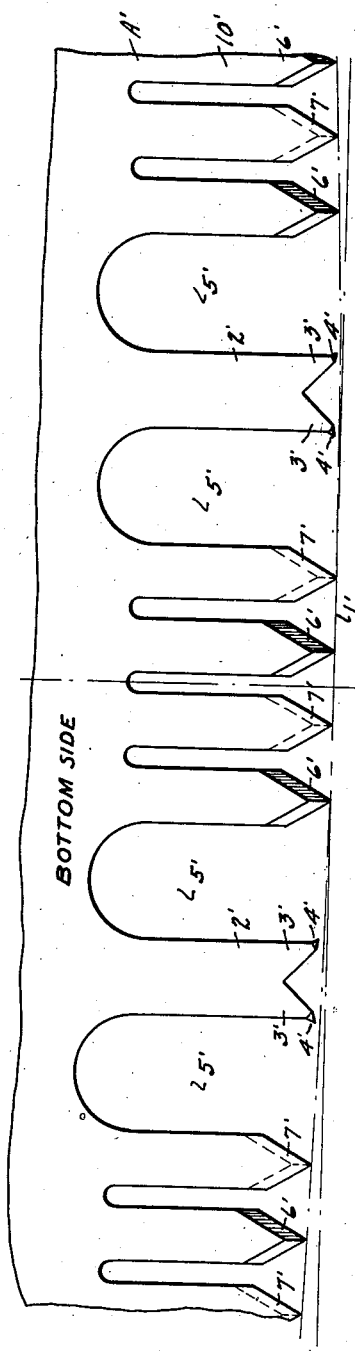
Fig. 1. PRIOR ART
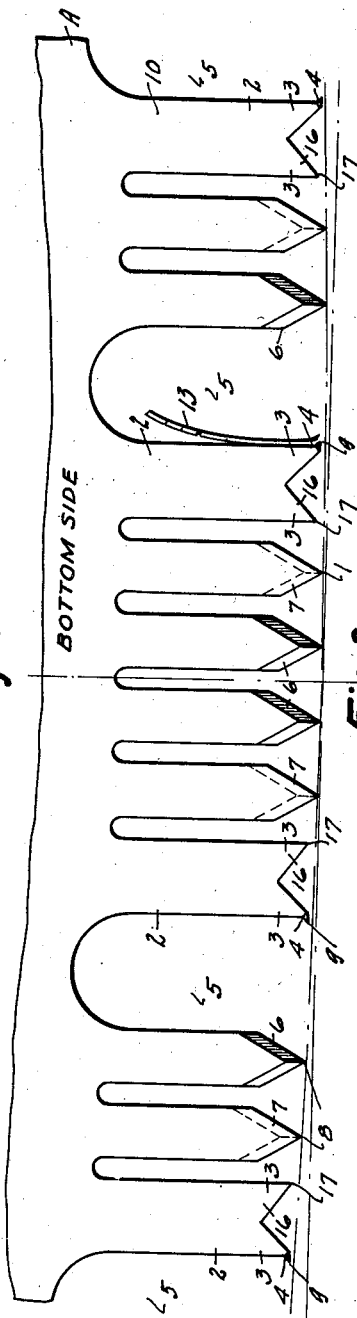
Fig. 2.
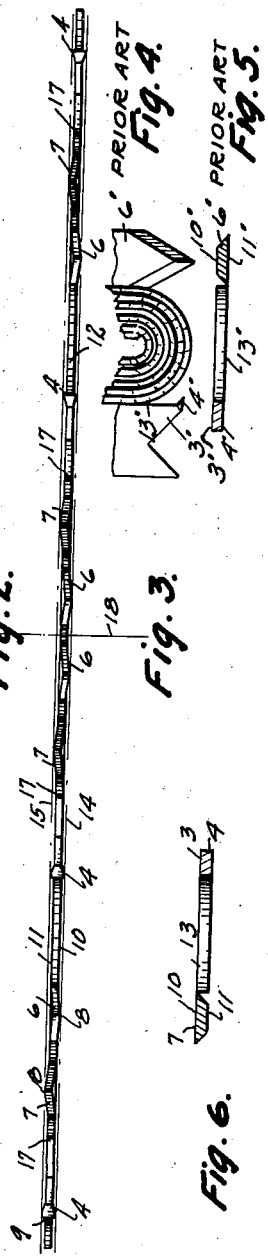
Fig. 3.
Fig. 4. PRIOR ART
Fig. 5. PRIOR ART
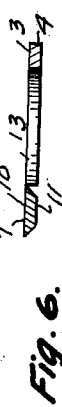
Fig. 6.

Patented Jan. 6, 1942

2,268,841

UNITED STATES PATENT OFFICE 2,268,841

SAW

Floyd R. Morin, Marshfield, Oreg.

Application September 19, 1939, Serial No. 295,627

1 Claim. (Cl. 143—133)

My invention relates to saws which are operable thru reciprocating motion and particularly to what are known to the logging fraternity as falling saws The principal object of my invention is to provide a faster, smoother, and easier cutting saw and incidentally to reduce the exertions of the faller and the time required to accomplish his objective—the falling of a tree.

A cross section of a Douglas fir, for instance, comprises a series of concentric rings of spring and summer wood. Each pair of rings represent the growth of the tree during a year. The spring wood is soft and spongy and generally of greater area than the summer wood which is harder and firmer. This contrast is sometimes very great. The number of rings may vary from four to sixty to the inch. This variation of texture and the alternate spacing of the annular rings of spring and summer wood has a tendency to make the saw dig into the spring wood and ride over the summer wood thereby making the action of the saw rough and the surface of the kerf rough thus creating friction and a chance for sawdust to wedge in.

Douglas fir grows up to eight feet in diameter, redwoods are often larger. Falling saws are five foot and longer. Men with three foot arms cannot pull a full stroke with the saws required to cut these large trees and as a consequence sawdust from the far side of the tree is carried toward the middle and must be carried back and out on the return stroke, which incidentally carries sawdust from the near side of the tree toward the middle. Because of this shuttling back and forth of the sawdust much of it finds its way under the saw where it causes friction and sometimes jambs and wedges. This cannot be avoided where raker or plowing teeth are provided to cut in either direction thruout the length of the saw. The ideal condition is for the saw to cut thru contrasting spring and summer wood smoothly and easily, for the kerf to be smooth, and for the sawdust to be removed before it can cause undue friction, wedge or jamb. A fast, smooth, and easy cutting saw must be properly designed as well as properly fitted. I have provided such a saw and have illustrated it in the accompanying drawing. I have also illustrated a portion of the present day falling saw in order to more clearly distinguish between it and my improved saw.

Thruout the drawing and this specification similar numerals refer to similar parts.

Fig. 1 is a bottom view of a portion of the present day standard falling saw; Fig. 2 is a bottom view of a portion of my improved saw; Fig. 3 is an edge view of Fig. 2; Fig. 4 is a partial plan view of a sawdust shaving coiled in a gullet of the present day saw; Fig. 5 is an edge view of Fig. 4, part in section; Fig. 6 is an edge view similar to Fig. 5, but of my saw.

A falling saw A, a porton of which is shown in Figs. 1 and 2, is formed as a segment of a great circle from a thin piece of tempered steel. Teeth are formed on its curved edge 1'. This curved edge 1' permits free adaptation of the saw to the arcuate movement of the user's arms as he reciprocates said saw. The present standard form and arrangement of teeth, as adopted by the leading saw manufacturers, is shown in Fig. 1, which I will briefly describe. The curved cutting edge 1' is provided with a plurality of raker posts 2' bifurcated to form diverging legs 3', each of which is formed to provide a chisel-face plowing tooth 4', commonly called a raker tooth. One plowing tooth is adapted to cut when the saw is moved to the right and the other when the saw is moved to the left. This arrangement of plowing teeth extends the entire length of the saw. Provided for each plowing tooth 4' is a wide sawdust-receiving gullet 5'. Between the gullets positioned between adjacent raker posts are four lance or scoring teeth designated 6' and 7'. These teeth are alternately and oppositely bevelled as shown, and their function is to define the boundary of the kerf. They are fitted to score the kerf slightly deeper than the thickness of the shaving of sawdust that it is desired to remove with the plowing teeth 4'. However, nothing is provided to keep the scoring or plowing teeth from digging into the soft wood and riding over the hard wood. It will be further noted that the lance or scoring tooth 6' adjacent one plowing tooth 4' is bevelled on the bottom side of the saw while the tooth 7' adjacent the opposite plowing tooth 4' is bevelled on the top side of the saw. In other words, the scoring teeth on each side of a raker post 2' are oppositely bevelled and therefore the sawdust shaving does not leave the gullets 5' in a similar manner on both ends of the saw and hence when the stroke is reversed, top bevelled teeth tend to lift sawdust onto the saw by which it is eventually worked out of the kerf, which is desirable, while the bottom-bevelled teeth tend to force sawdust under the saw whereby friction is caused from wedging and jambing, and a rough kerf is had, all of which is undesirable. More will be said about this bevelling later on. I eliminate much and many of the undesirable features above mentioned in my improved saw which I shall now describe.

A portion of my improved saw is illustrated in Figs. 2 and 3. Its curved cutting edge 1 is provided with the raker posts 2 bifurcated to form the diverging legs 3 upon one of which is swaged a plowing tooth 4, or raker tooth as it is commonly called, having a width equal to the desired kerf. The sawdust-receiving gullet 5 is provided forward of each plowing tooth 4, and adjacent said gullet are the bottom-bevelled lance or scoring teeth 6 preceded by the top-bevelled scoring teeth 7. The bottom-bevelled tooth 6 is always positioned adjacent the gullet 5 and incidently the plowing tooth 4. Only two scoring teeth are shown, but it is desirable to use four, or any even number so that the saw may remain balanced, where the texture of the wood is such as to wear down the points 8 ahead of the chisel-face cutting edge 9 of the plowing tooth 4. The bottom and top bevelling is relative to the bottom and top sides 10 and 11, respectively, of the saw. The points 8 of the scoring teeth are set to score the kerf 12 slightly deeper than the thickness of the sawdust shaving 13 that it is desired to remove. The points 8 on the teeth 6 are set to define the top boundary 14 of the kerf 12 while the points 8 on the teeth 7 are set to define the bottom boundary 15 of said kerf. The thickness of the above mentioned sawdust shaving 13 is fixed, in my saw, by providing the stops 16 which, as illustrated, are a blunt termination 17 of the other leg 3 of the raker post 2. This termination 17 is short of the chisel-face cutting edge 9 of the plowing tooth 4 a distance equal to the thickness of the sawdust shaving 13 it is desired to remove by said tooth 4. To the right of the saw center line 18 the teeth 4 are formed on the right hand leg 3 of the raker post 2, while to the left of the center line said teeth are formed on the left hand leg 3 of the raker post 2. In other words, when the saw is moved to the right only the teeth 4 on the right hand half of the saw cut, and when the saw is moved to the left only the teeth on the left hand half of the saw cut. From the above it is obvious that sawdust is not dragged into the kerf from the left hand side of the tree when the saw is moved to the right, or from the right hand side of the tree when the saw is moved to the left. It is obvious that when the stroke is reversed any sawdust remaining in the gullets stays there. The sawdust shaving 13 curls up in the gullet 5 similar to a spring and it has some tension in it tending to cause it to open up or straighten out when side pressure is released. When the shaving is in the kerf it cannot move in any direction unless it breaks up. When the gullet is clear of the kerf, as at the end of the stroke, top and bottom pressure is released and gravity tends to cause the shaving to drop, while the tension stored up in the coil tends to cause the same to pop open, and it does. Since the construction is the same at both ends of the saw the action is the same, while in the present saw, one side is free as shown in Fig. 5, and the other side is obstructed as shown in Fig. 6, hence, the gullets are not cleared as fast or as clean. It will be noted that with my arrangement I eliminate one half of the gullets which space is incidently utilized for cutting and scoring teeth. It is further pointed out that the plowing teeth 4 are closely supported by a depth gauge stop 16 which is formed in space and of material unnecessary to either the structure or strength of the saw parts since the raker post 2 is cantilevered from the saw body and the stresses diminish from the body out. Without illustration it may be pointed out that the stops 16 may be formed as individual units as for instance, by dubbing off a lance tooth.

Having described my invention so that anyone skilled in the art may incorporate parts singly or severally in a saw, I claim:

A falling saw comprising a plurality of sawdust-receiving gullets, a plurality of raker teeth, those on each side of the saw centerline having their cutting edge facing the respective saw end, and two or more lance teeth positioned on the opposite side of the gullet from a raker tooth, each lance tooth adjacent the gullet being bevelled on the bottom side of the saw thruout its length whereby sawdust is free to drop downwardly out of the gullet in a like manner on each end of the saw.

FLOYD R. MORIN.